(12) United States Patent
Miyokawa et al.

(10) Patent No.: US 8,000,567 B2
(45) Date of Patent: Aug. 16, 2011

(54) OPTICAL SEMICONDUCTOR MODULE

(75) Inventors: Jun Miyokawa, Tokyo (JP); Takashi Koseki, Tokyo (JP); Toru Fukushima, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/761,910

(22) Filed: Apr. 16, 2010

(65) Prior Publication Data

US 2010/0195962 A1    Aug. 5, 2010

Related U.S. Application Data

(60) Division of application No. 12/147,060, filed on Jun. 26, 2008, now Pat. No. 7,738,747, which is a division of application No. 11/837,084, filed on Aug. 10, 2007, now Pat. No. 7,477,810, which is a continuation of application No. 10/460,405, filed on Jun. 13, 2003, now abandoned.

(30) Foreign Application Priority Data

Jun. 14, 2002  (JP) .................................. 2002-174969

(51) Int. Cl.
  *G02B 6/12* (2006.01)
  *G02B 6/36* (2006.01)
(52) U.S. Cl. ............................... 385/14; 385/89; 385/92
(58) Field of Classification Search .................... 385/14, 385/89, 92
  See application file for complete search history.

(56) References Cited

U.S. PATENT DOCUMENTS

| | | | |
|---|---|---|---|
| 3,007,283 A | 11/1961 | Holland | |
| 3,767,839 A | 10/1973 | Beal | |
| 4,399,541 A | 8/1983 | Kovats et al. | |
| 4,515,434 A | 5/1985 | Margolin et al. | |
| 4,647,148 A | 3/1987 | Katagiri | |
| 4,846,171 A * | 7/1989 | Kauphusman et al. | 606/15 |
| 4,865,410 A | 9/1989 | Estrada et al. | |
| 4,980,568 A | 12/1990 | Merrick et al. | |
| 5,042,895 A | 8/1991 | Chouinard et al. | |
| 5,138,676 A * | 8/1992 | Stowe et al. | 385/32 |
| 5,430,620 A * | 7/1995 | Li et al. | 362/572 |
| 5,748,822 A * | 5/1998 | Miura et al. | 385/90 |
| 5,966,488 A * | 10/1999 | Miura et al. | 385/93 |
| 6,004,046 A * | 12/1999 | Sawada | 385/92 |
| 6,081,637 A * | 6/2000 | Rekow | 385/31 |
| 6,112,002 A | 8/2000 | Tabuchi | |

(Continued)

FOREIGN PATENT DOCUMENTS

EP   0 259 018   3/1988
(Continued)

*Primary Examiner* — K. Cyrus Kianni
(74) *Attorney, Agent, or Firm* — Oblon, Spivak, McClelland, Maier & Neustadt, L.L.P.

(57) ABSTRACT

An optical semiconductor module including a base having installed on an optical fiber and an optical semiconductor element, and a package which houses the base on a bottom thereof and has a first side wall with an optical section through which the optical fiber is led and a second side wall facing the first side wall, where the base is cut off to form a curved surface with respect to the bottom at a lower corner on a side of the base facing the second side wall of the housing, and a ratio of r/t is from 0.4 to 1.0, where t is a thickness of the base, and r is a curvature radius of the curved surface.

6 Claims, 16 Drawing Sheets

U.S. PATENT DOCUMENTS

| | | | |
|---|---|---|---|
| 6,155,724 A | 12/2000 | Ichino et al. | |
| 6,213,650 B1 * | 4/2001 | Moriyama et al. | 385/88 |
| 6,271,102 B1 | 8/2001 | Brouillette et al. | |
| 6,280,102 B1 | 8/2001 | Go | |
| 6,390,690 B1 | 5/2002 | Meis et al. | |
| 6,448,583 B1 | 9/2002 | Yoneda et al. | |
| 6,502,999 B1 | 1/2003 | Cohen et al. | |
| 6,530,698 B1 * | 3/2003 | Kuhara et al. | 385/88 |
| 6,837,627 B2 * | 1/2005 | Nakanishi et al. | 385/92 |
| 2001/0026664 A1 | 10/2001 | Tanaka et al. | |
| 2001/0038498 A1 | 11/2001 | Furuhashi et al. | |
| 2002/0012370 A1 | 1/2002 | Ishimaru | |
| 2002/0181853 A1 | 12/2002 | Ido et al. | |
| 2003/0071318 A1 * | 4/2003 | Wang | 257/434 |
| 2003/0077049 A1 | 4/2003 | Dharia et al. | |
| 2003/0077053 A1 | 4/2003 | Panicker et al. | |
| 2003/0169981 A1 * | 9/2003 | Nakanishi et al. | 385/92 |
| 2004/0069997 A1 * | 4/2004 | Dair et al. | 257/81 |
| 2004/0240036 A1 * | 12/2004 | Porte et al. | 359/322 |
| 2008/0031567 A1 * | 2/2008 | Miyokawa et al. | 385/14 |
| 2008/0078924 A1 * | 4/2008 | Johnson | 250/227.11 |

FOREIGN PATENT DOCUMENTS

| | | |
|---|---|---|
| EP | 0 381 370 | 8/1990 |
| EP | 0 484 167 | 5/1992 |
| JP | 59-47789 | 3/1984 |
| JP | 2001-004881 | 1/2001 |
| JP | 2001-281498 | 10/2001 |
| WO | WO 03/021323 | 3/2003 |

* cited by examiner

OPTICAL SEMICONDUCTOR MODULE

CROSS-REFERENCE TO RELATED APPLICATIONS

This application is a division of U.S. Ser. No. 12/147,060, filed Jun. 26, 2008, which is a division and claims the benefit under 35 U.S.C. §120 from parent application, U.S. Ser. No. 11/837,084, (U.S. Pat. No. 7,477,810), filed Aug. 10, 2007, of which the entire contents of both are incorporated herein by reference. Application Ser. No. 11/837,084 is a continuation of U.S. Ser. No. 10/460,405 (U.S. Patent Publication No. 2003/0235377 A1) filed Jun. 13, 2003, and claims the benefit of priority under 35 U.S.C. §119 from Japanese Patent Application No. 2002-174969, filed Jun. 14, 2002.

BACKGROUND OF THE INVENTION

1) Field of the Invention

The present invention relates to an optical semiconductor module having an optical semiconductor element and an optical fiber that are used for optical communications.

2) Description of the Related Art

FIG. 23A is a plan view of a part of a conventional semiconductor laser diode (hereinafter, "LD") module, and FIG. 23B is a longitudinal cross-sectional view of the part. The LD module includes a base 6 onto which a heat sink 3 and a carrier 5 are soldered. On the heat sink 3, an LD element 1 and a thermistor 2 are mounted, and on the carrier 5, a photo diode (hereinafter, "PD") element 4 is mounted. Further, a metal ferrule 7a supporting an optical fiber 7 is fixed onto the base 6 via two support members 6a by YAG laser welding or with solder. The welding points, in the drawings, are denoted by solid circles $P_{wd}$. The optical fiber 7 is precisely aligned so as to be optically coupled with a laser beam emitted from the LD element 1, and is fixed onto the support member 6a.

FIG. 24 is a longitudinal cross-sectional view of the conventional LD module, where the base 6 is accommodated within a package 8, and is fixed onto a bottom plate 8e of the package 8. The package 8 is sealed with a lid 9 at the upper opening, thereby to complete the assembly of the LD module. A lensed fiber, one end of which being formed in a spherical or a wedged shape to serve as a lens portion, is used as the optical fiber 7 in order to ensure a high coupling efficiency between the optical fiber 7 and the laser beam emitted from the LD element 1. The other end of the optical fiber 7 is led out of the package 8 through a longitudinal hole 8a of a snout 8b prior to mounting of the base 6 onto the bottom plate 8e of the package 8. A portion between the optical fiber 7 and the internal wall of the snout 8b is hermetically sealed with sealant S like solder or synthetic resin.

The LD module, particularly one using the lensed fiber, requires that the LD element 1 and the lensed fiber are coupled with an extremely high precision, and that the optical fiber 7 and the support member 6a are precisely positioned.

In the LD module shown in FIG. 24, the base 6 is directly fixed onto the bottom plate 8e, with no Peltier module for cooling interposed. The longitudinal hole 8a in FIG. 24 is formed through a front wall 8c of the package 8 at a position far down from the upper end of the front wall 8c. Such position of the longitudinal hole 8a makes the mounting of the base 6 difficult.

FIG. 25 is a longitudinal cross-sectional view of the conventional LD module in the mounting step. In the mounting step, the base 6 is accommodated onto the bottom plate 8e, maintaining a state that the optical fiber 7 passes through the longitudinal hole 8a. In such a situation, a position of the metal ferrule 7a holding the optical fiber 7 is limited by the position of the longitudinal hole 8a, causing often an interference between a lower portion of the base 6 and a rear wall 8d of the package 8 when mounting the base 6, depending on sizes of the package 8 and the base 6. And while the base 6 is being mounted onto the bottom plate 8e of the package 8 so as to avoid the interference, stress is often applied to the optical fiber 7 and thereby the optical fiber 7 is bent, pressed, or pulled. In this way, this stress often causes misalignment between the LD element 1 and the optical fiber 7.

Further, in the mounting step, the optical fiber 7 is often excessively bent at a portion A encircled by a dashed line in FIG. 25, by contact with the snout 8b. In some cases, the optical fiber 7 is coated with metal (e.g., gold), in order to facilitate the hermetic sealing of the optical fiber 7 inside the inner space of the snout 8b with solder S or other sealant, or in order to facilitate the soldering of the optical fiber 7 to the base 6. Such metal-coated optical fibers have a minimum allowable bending curvature radius larger than that of non-coated optical fibers and are more repulsive against the bending deformation. Therefore, the optical fiber 7 needs to be handled so as not to be bent too much.

The similar situation may be present not only in optical semiconductor modules in general of butterfly-type, including receiver modules (hereinafter, "PD modules") having a PD element mounted on the base 6, but also in the LD module of so-called DIL (Dual In Line) type which utilizes a small-sized package.

SUMMARY OF THE INVENTION

The optical semiconductor module according to one aspect of the present invention includes an optical semiconductor element; an optical fiber optically coupled with the semiconductor element; a base having an upper surface and a lower surface, the optical fiber and the optical semiconductor element being mounted on the upper surface; and a package having a bottom plate on which the base is directly mounted, a front wall having a hole through which the optical fiber is inserted, and a rear wall opposite to the front wall, wherein the base has a rear face formed on an end portion opposite to the front wall, the rear face being positioned above the lower surface.

The optical semiconductor module according to another aspect of the present invention includes an optical semiconductor element; an optical fiber optically coupled with the semiconductor element; a base having an upper surface and a lower surface, the optical fiber and the optical semiconductor element being mounted on the upper surface; a package having a bottom plate on which the base is directly mounted, and a front wall having a hole through which the optical fiber is inserted; and a lid having a first portion disposed above the base and a second portion facing the hole, the first portion and the second portion of the lid being combined with each other to cover the package.

The other features and advantages of the present invention are specifically set forth in or will become apparent from the following detailed descriptions of the invention when read in conjunction with the accompanying drawings.

BRIEF DESCRIPTION OF THE DRAWINGS

FIG. 2 is a top plan view of a package of the LD module shown in

FIG. 1;

DETAILED DESCRIPTION

Figure 24:
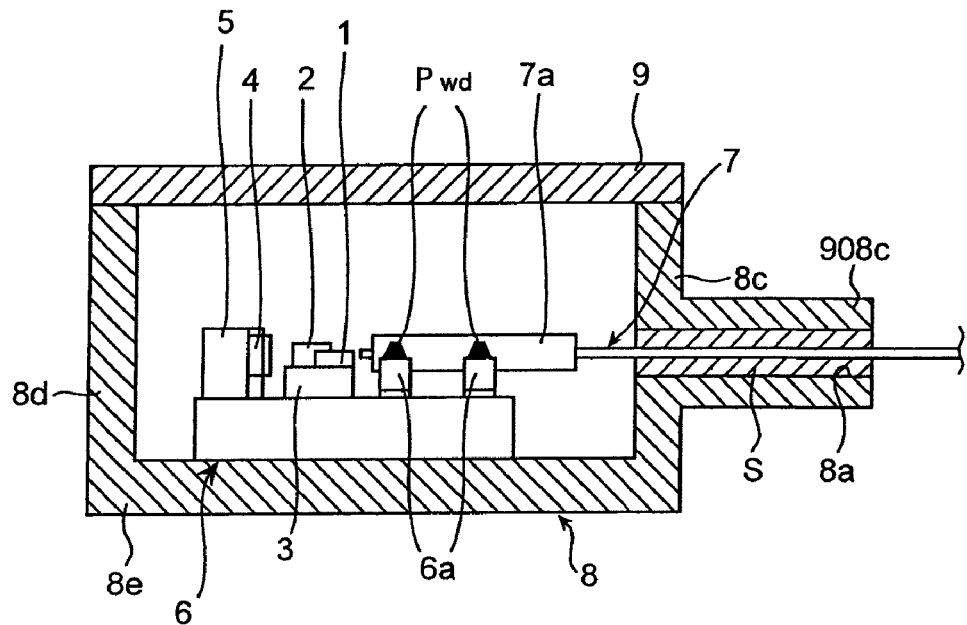
FIG. 24 is a longitudinal cross-sectional view of the conventional LD module.
Figure 25:
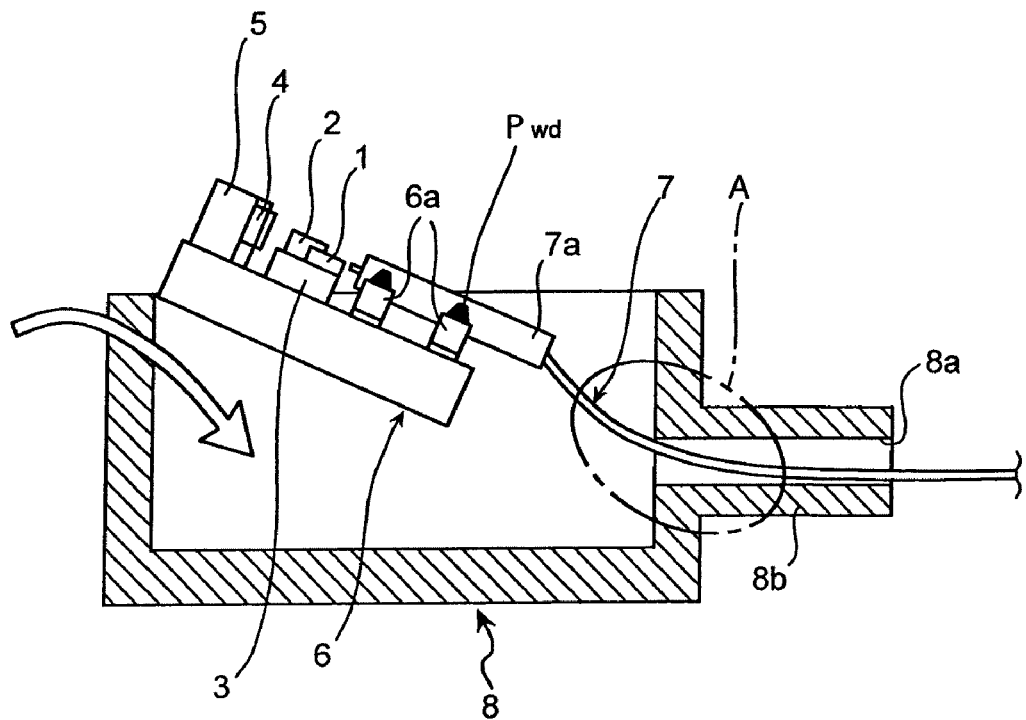
FIG. 25 is a longitudinal cross-sectional view of the conventional LD module in the mounting step.

Exemplary embodiments of the optical semiconductor module relating to the present invention will be explained in detail below with reference to the accompanying drawings. In the following embodiments, constituent parts identical with those of the LD module shown in FIG. 24 are designated with like reference symbols.

Figure 1:
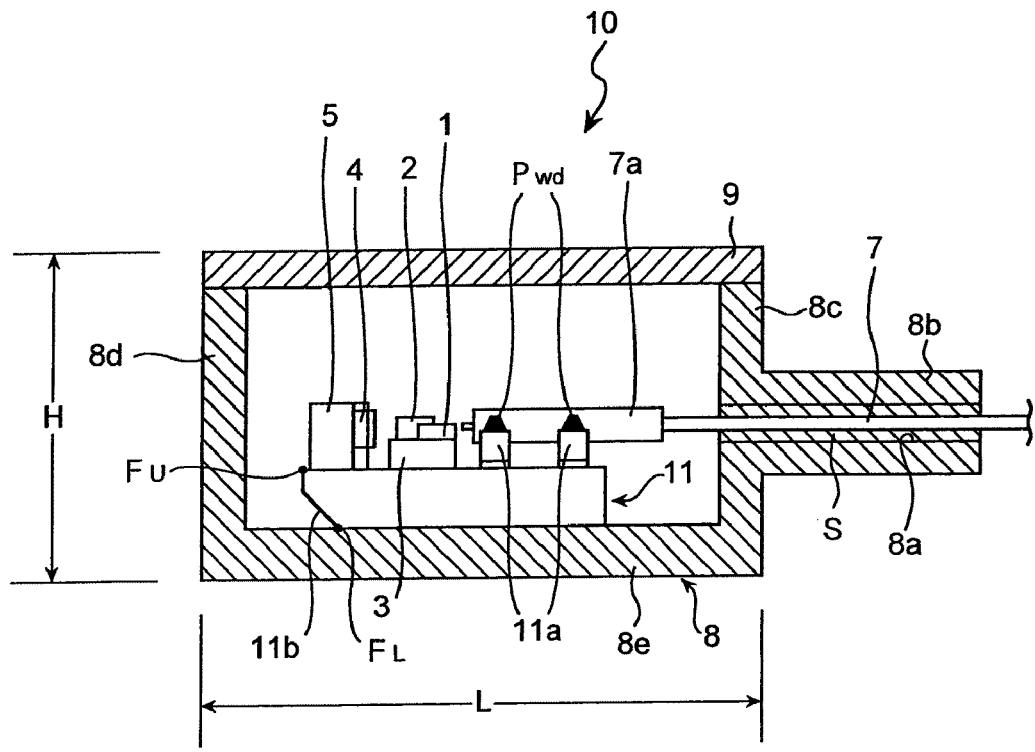
FIG. 1 is a longitudinal cross-sectional view of a LD module according to a first embodiment of the present invention.

An optical semiconductor module according to a first embodiment of the present invention is an LD module. FIG. 1 is a longitudinal cross-sectional view of the LD module. This LD module 10 differs from the conventional LD module shown in FIG. 24, in that a base 11 is fixed onto the bottom plate 8e instead of the base 6. On the base 11 are provided, the heat sink 3 mounting thereon the LD element 1 and the thermistor 2, the carrier 5 mounting thereon the PD element 4, and two pieces of support members 11a supporting the metal ferrule 7a holding the optical fiber 7. The metal ferrule 7a is fixed to the base 11 through the two support members 11a by YAG laser-welding or soldering. The optical fiber 7 is arranged to pass through the longitudinal hole 8a of the snout 8b. The portion between the optical fiber 7 and the internal wall of the snout 8b is hermetically sealed with a sealant S like solder. The package 8 is sealed with the lid 9 at the upper opening. The package 8 also has a front wall 8c and a rear wall 8d that faces the front wall 8c.

Figure 2:
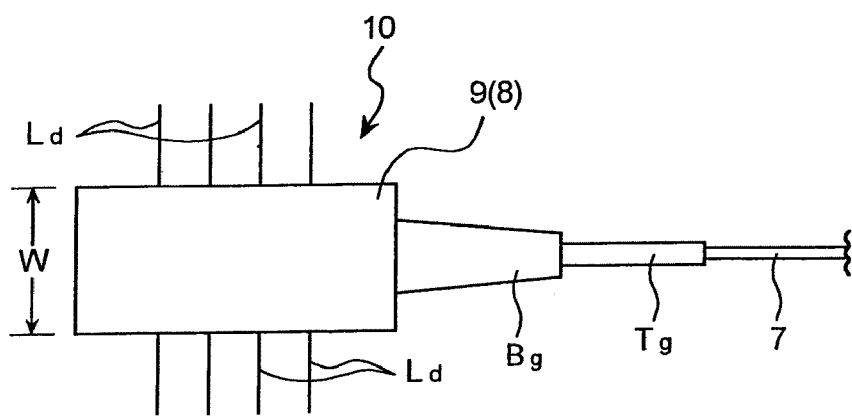

FIG. 2 is a top plan view of the package 8. The package 8 is of a butterfly type having a plurality of leads $L_d$ protruding from the package 8 at both sides. The snout 8b is covered with a rubber covering $B_g$. A part of the optical fiber 7 that is led out of the package 8 is protected by a protective tube $T_g$. The package 8 has a length L not larger than 16 millimeter, a width W not larger than 10 millimeter, and a height H not larger than 8 millimeter, as shown in FIGS. 1 and 2.

Figure 3:
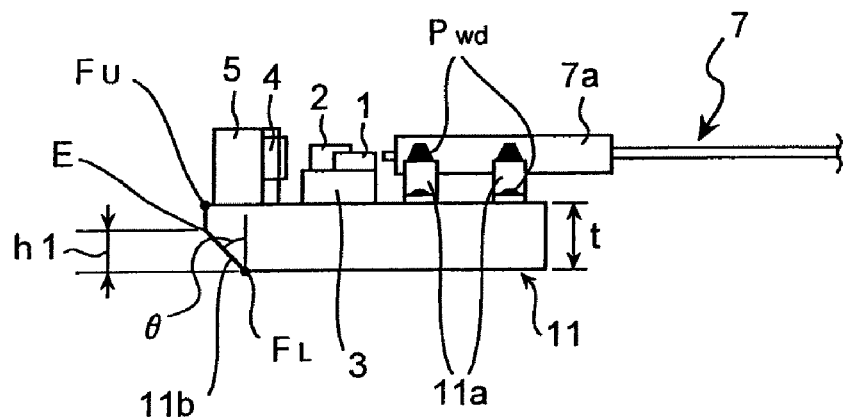
FIG. 3 is a longitudinal cross-sectional view of a part of the LD module shown in FIG. 1.

FIG. 3 is a longitudinal cross-sectional view of a part of the LD module shown in FIG. 1, and specifically illustrates the base 11. The base 11 differs from the base 6 shown in FIGS. 23A, 23B, 24, and 25, in the shape of the rear end portion to be faced to the rear wall 8d of the package 8. As shown in FIG. 3, the base 11 has a rear end portion E having an upper edge $F_U$ and an lower edge $F_L$. The lower edge $F_L$ is positioned nearer to the front end portion of the base 11 than the upper edge $F_U$. In other words, the base 11 has a taper 11b that is inclined from the vicinity of the upper edge $F_U$ toward the lower edge $F_L$, at the rear end portion E. As a result, the formation of the taper 11b is equivalent to elimination of the rear lower corner of the base 11.

Figure 4:
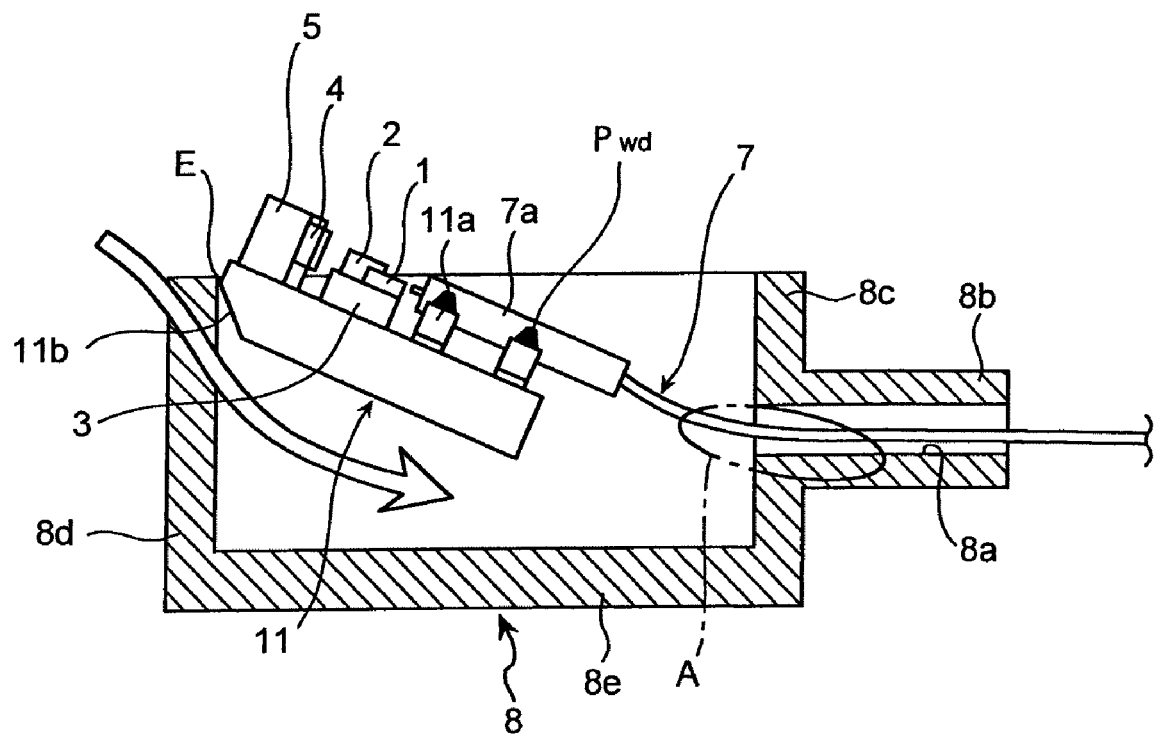
FIG. 4 is a longitudinal cross-sectional view of the LD module in the mounting step.

FIG. 4 is a longitudinal cross-sectional view of the LD module in the mounting step. When the base 11 is mounted into the package 8 in a direction of an arrow mark shown in the FIG. 4, no interference occurs between the base 11 and the rear wall 8d of the package 8. This is because of the elimination of the rear lower corner of the base 11 by the taper 11b. Therefore, the base 11 can be easily mounted onto the bottom plate 8e of the package 8. Consequently, no significant misalignment between the LD element 1 and the optical fiber 7 can occur in the mounting step and it is possible to suppress a reduction in the coupling efficiency between the laser beam emitted from the LD element 1 and the optical fiber 7.

Moreover, the prevention of interference between the base 11 and the rear wall 8d results in a prevention of an excessive bend of the optical fiber 7 at the portion A encircled by the dashed line in FIG. 4. Consequently, the optical fiber 7 can be maintained at a large radius of bending curvature during the mounting step into the package 8, and is free from a breakage arising from the excessive bending.

Figure 5A:
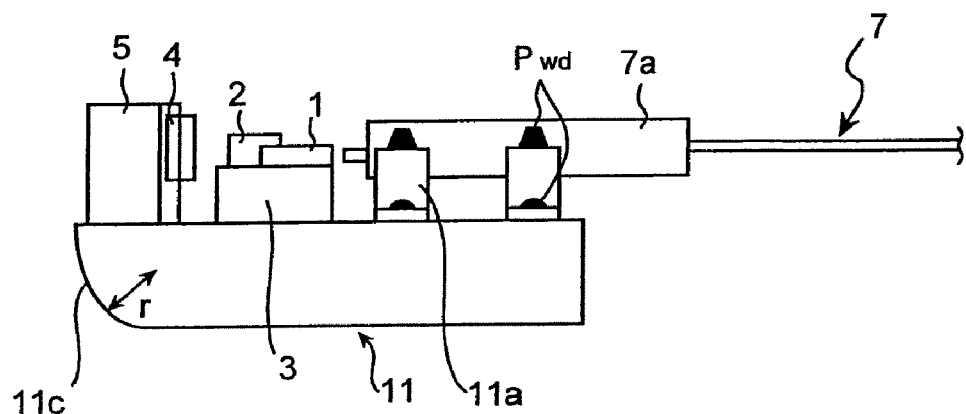
FIG. 5A and FIG. 5B are longitudinal cross-sectional views of other examples of a base of the LD module.
Figure 5B:
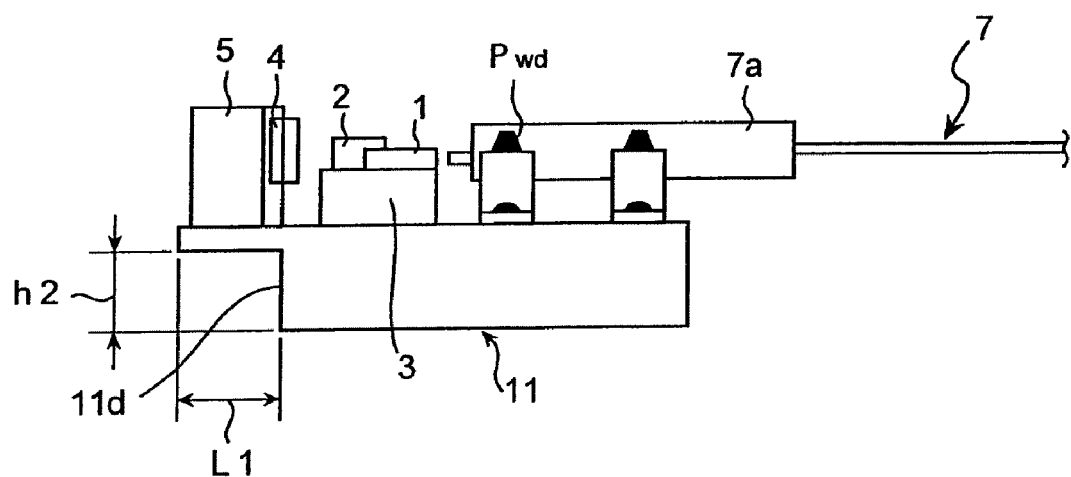

The shape of the rear end portion E of the base 11 is not limited to that shown in FIG. 3. The rear end portion E may be formed into various shapes to avoid an interference against the rear wall 8d in the mounting step. For example, the rear end portion may be formed into a curved face 11c with a curvature radius of r as shown in FIG. 5A, or a step 11d with a height h2 and a length L1 as shown in FIG. 5B.

In the LD module 10 according to the present embodiment, the base 11 is mounted into the package 8 in the state that the rear end portion E is slightly inclined from a horizontal state such that the optical fiber 7 led from the snout 8b to the outside of the package is not excessively bent. When the base 11 is formed into the taper 11b, for example, a height h1 of the base 11 from its bottom surface to a line of intersection between the taper 11b and the rear end surface of the base 11 is set to a range of about $0.4 \leq h1/t \leq 1.0$, where t is a thickness of the base 11, as shown in FIG. 3. While an inclination angle of the taper face 11b is suitably set according to a size of the package 8, an inclination angle θ within a side cross-sectional surface of the base 11 parallel to an optical axis is set to a range of about $20° \leq θ \leq 60°$. On the other hand, when the base 11 is formed to have the curved face 11c having a cylindrical surface or the step 11d, the radius r of the cylindrical surface (see FIG. 5A) or the height h2 and the length L1 of the step (see FIG. 5B) are set to ranges of about $0.4 \leq r/t$, $L1/t \leq 1.0$, and $0.4 \leq h2/t \leq 0.7$, where t is a thickness of the base 11.

Figure 6A:
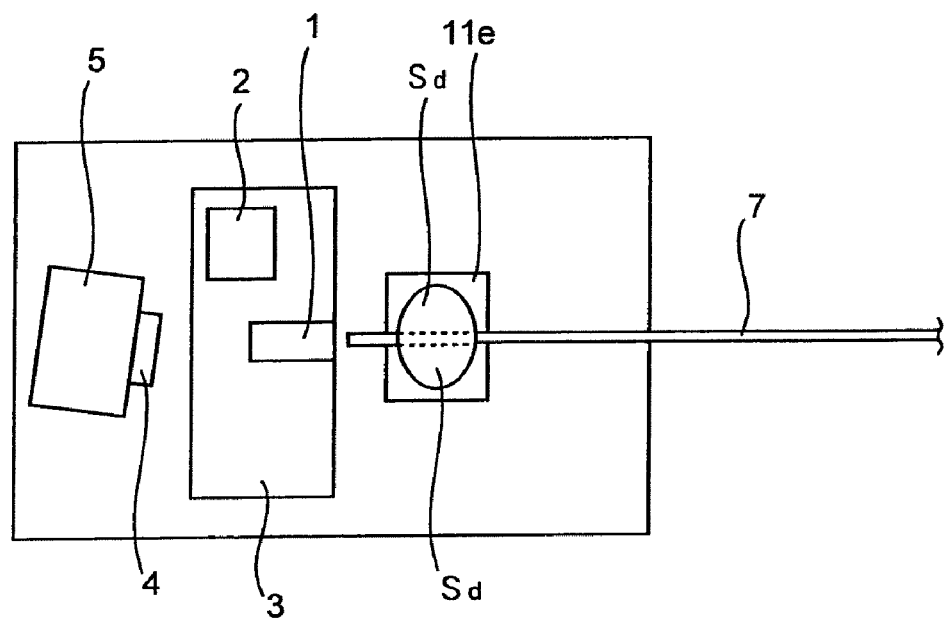
FIG. 6A is a top plan view of other example of the base.
Figure 6B:
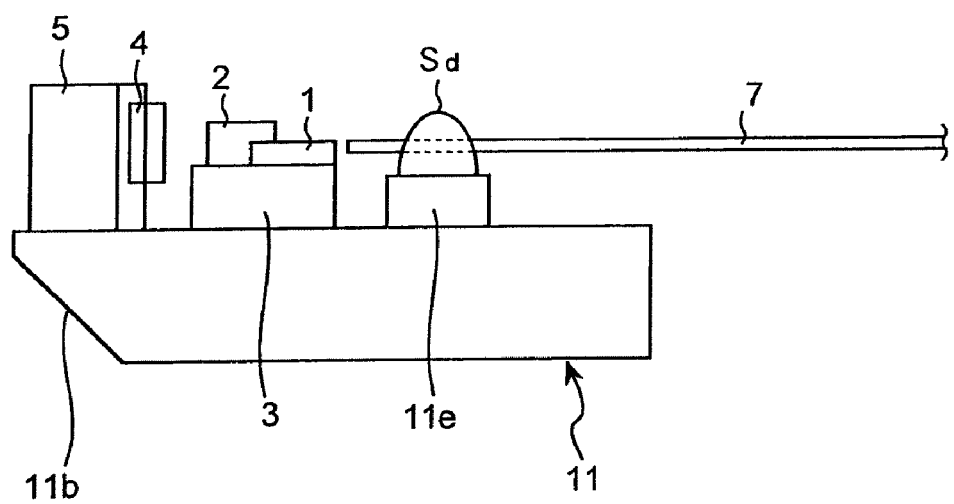
FIG. 6B is a longitudinal cross-sectional view of the base shown in FIG. 6A.

The optical fiber 7 may be directly fixed with solder Sd, onto a support member 11e that is fixed to the base 11, with no metal ferrule 7a employed, as shown in FIGS. 6A and 6B. It is needless to mention that the rear end portion E of the base 11 may also be formed into the curved face 11c or the step 11d as shown in FIG. 5A or FIG. 5B. The support member 11e may be made of nonmetal such as ceramic, for example. When the optical fiber 7 is fixed onto the support member 11e with an adhesive or a synthetic resin, an optical fiber of which external periphery is not metal-coated may also be used.

Figure 7:
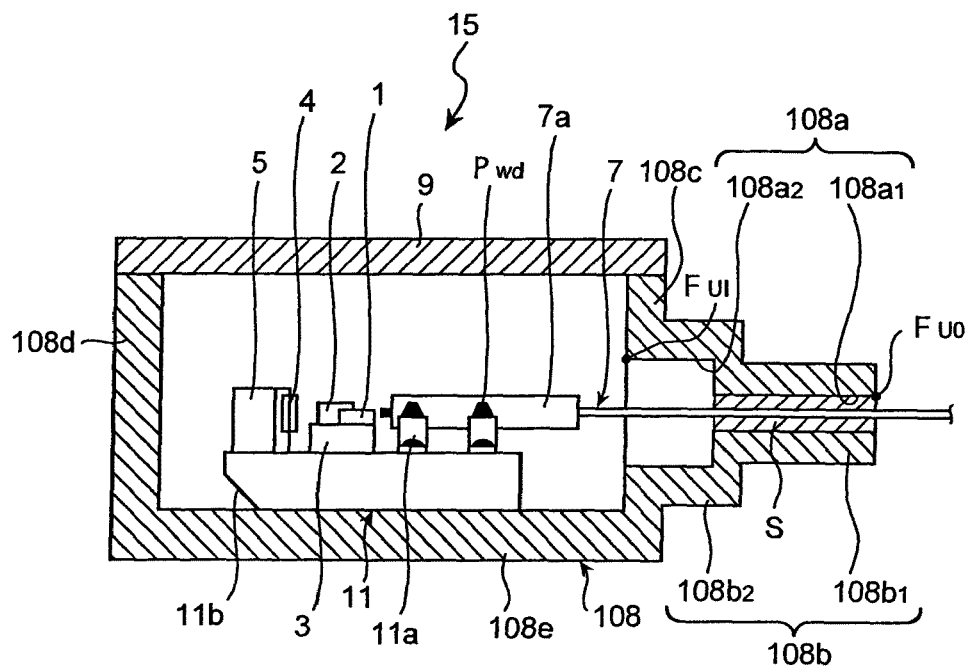
FIG. 7 is a longitudinal cross-sectional view of a LD module according to one example of a second embodiment of the present invention.

FIG. 7 is a longitudinal cross-sectional view of an LD module according to the second embodiment of the present invention. The LD module 15 differs from the conventional LD module, in the shape of its package. The LD module 15 is configured as an optical semiconductor module having a butterfly-type package. As shown in FIG. 7, a snout 108b of a package 108 consists of a first part 108$b_1$ and a second part 108$b_2$. The second part 108$b_2$ has a larger diameter than that of the first part 108$b_1$, and is positioned between the first part 108$b_1$ and a front wall 108c of the package 108. These first part 108$b_1$ and the second part 108$b_2$ have a longitudinal hole 108a through them, for guiding the optical fiber 7 to the outside. The longitudinal hole 108a consists of a first longitudinal hole 108$a_1$ of the first part 108$b_1$, and a second longitudinal hole 108$a_2$ of the second part 108$b_2$. The longitudinal hole 108a is, concretely, formed such that an upper boundary $F_{UI}$ of the second longitudinal hole 108$a_2$ is located higher than an upper boundary $F_{UO}$ of the first longitudinal hole 108a1. As a result, the optical fiber 7, when led to the outside of the package 108 through the longitudinal hole 108a, is prevented from being brought into contact with the internal surface of the second longitudinal hole 108$a_2$. Therefore, an excessive bending deformation of the optical fiber 7 is suppressed.

Figure 8:
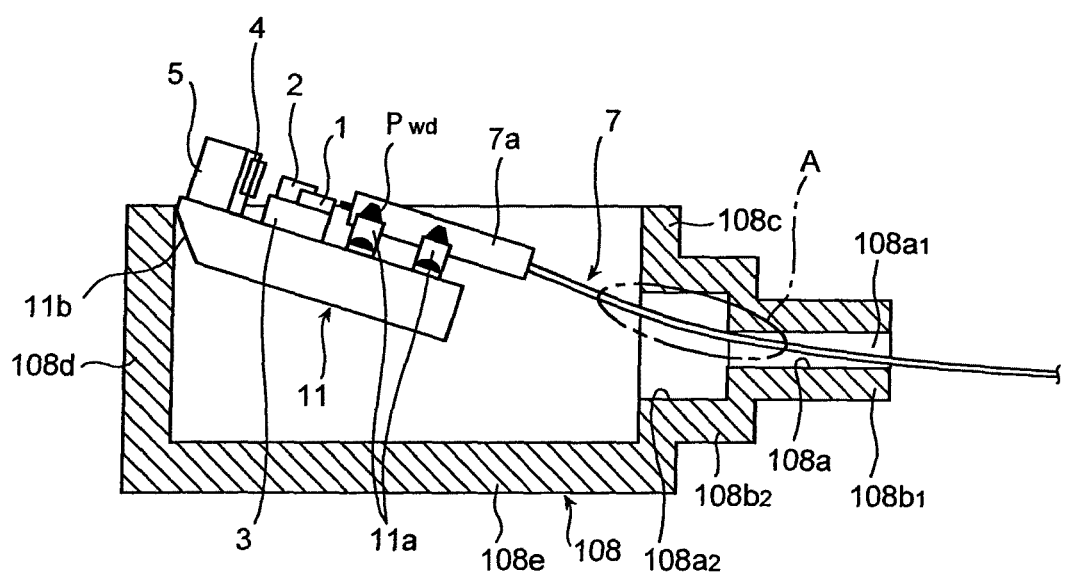
FIG. 8 is a longitudinal cross-sectional view of the LD module shown in FIG. 7 in the mounting step.

Consequently, in the LD module 15, in the mounting step of the base 11 into the package 108, it is possible not only to maintain a state of a large bending curvature radius of the optical fiber 7 by the taper 11b but also to prevent the optical fiber 7 from being brought into contact with the internal surface of the second longitudinal hole 108$a_2$ of the second part 108$b_2$ of the snout 108$_b$, as shown in FIG. 8. Consequently, in the LD module 15, it possible to prevent an excessive bending deformation of the optical fiber 7 arising from the interference between the optical fiber 7 and the internal surface of the longitudinal hole 108a that would otherwise occur at a portion A encircled by a dashed line.

The LD module 15 according to the second embodiment has an effect that the second part 108$b_2$ provided in the snout 108b prevents the optical fiber 7 from being excessively bent, in addition to the effect that the taper 11b of the base 11 facilitates the mounting of the base 11 into the package 108. Therefore, in the LD module 15, it is possible to suppress a breakage of the metal-coated optical fiber 7 in the mounting step more surely than in the LD module 10 according to the first embodiment. Note that the longitudinal hole 108a may have a plurality of diameters so as to have three or more steps. The snout 108b may take a shape other than that shown in FIG. 7, as far as it is possible to suppress the bending deformation of the optical fiber 7 in the mounting step. For example, the second part 108$b_2$ of the snout 8b is inclined toward the upper end portion of the front wall 108c, and the upper boundary $F_{UI}$ of the longitudinal hole 108a is positioned higher than the upper boundary $F_{UO}$.

Figure 9:
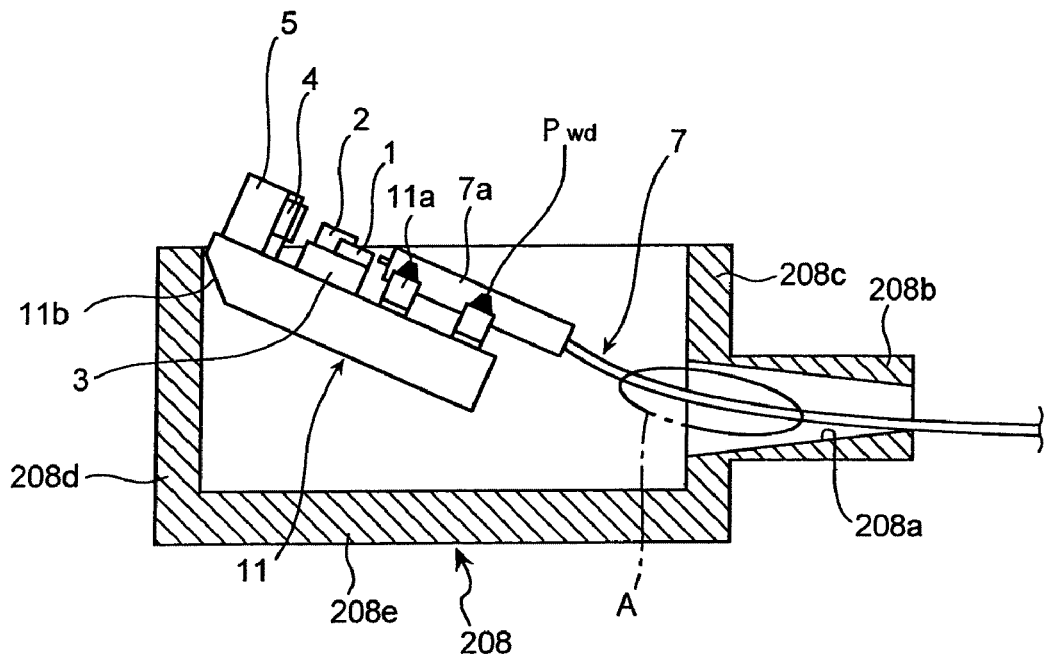
FIG. 9 is a longitudinal cross-sectional view of a LD module according to another example of the second embodiment in the mounting step.

A package 208 may be used in place of the package 108 (see FIG. 9). The package 208 has a front wall 208c, a rear wall 208d, a bottom plate 208e, and a snout 208b. An external diameter of the snout 208b is uniform along the longitudinal direction. The snout 208b has a longitudinal hole 208a whose diameter is linearly small toward the outside. In other words, the longitudinal hole 208a has taper at its internal surface along the longitudinal direction. The taper may not necessarily be formed over the entire of the internal surface along its longitudinal direction but may be formed at least on a part thereof. For example, the taper is formed on only a part of the internal surface near the front wall 208c.

Figure 10:
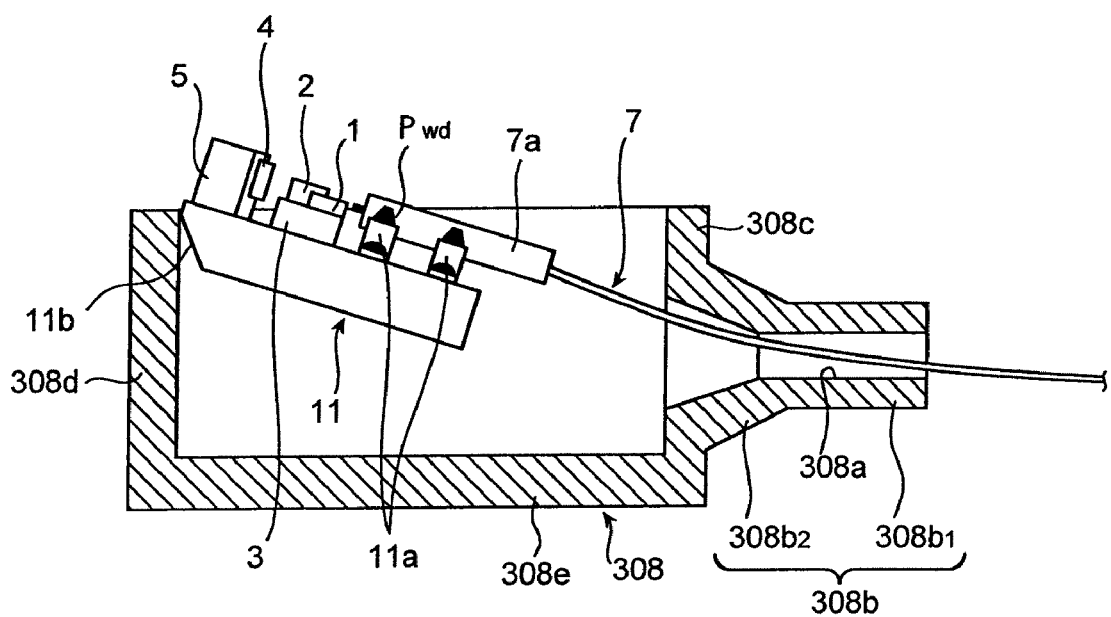
FIG. 10 is a longitudinal cross-sectional view of a LD module according to still another example of the second embodiment in the mounting step.

Further, a package 308 may be used in place of the package 108 (see FIG. 10). The package 308 has a front wall 308c, a rear wall 308d, a bottom plate 308e, and a snout 308b having a longitudinal hole 308a. The snout 308b has a first part 308$b_1$ and a second part 308$b_2$. A part of the longitudinal hole 308a on the first part 308$b_1$ has a uniform diameter along the longitudinal direction, and a part of longitudinal hole 308a on the second part 308$b_2$ has diameter that is linearly small toward the first part 308$b_1$. External diameters of the snout 308b are values corresponding to the diameters of the longitudinal hole 308a of the first part 308$b_1$ and of the second part 308$b_2$.

Figure 11:
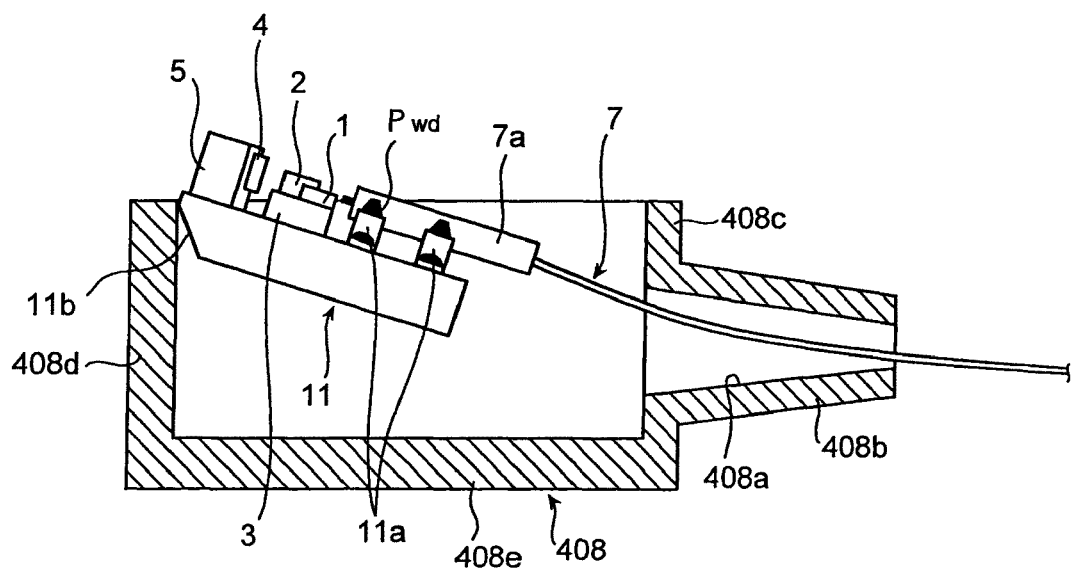
FIG. 11 is a longitudinal cross-sectional view of a LD module according to still another example of the second embodiment in the mounting step.

Further, a package 408 may be used in place of the package 108 (see FIG. 11). The package 408 has a front wall 408c, a rear wall 408d, a bottom plate 408e, and a snout 408b having a longitudinal hole 408a. The external diameter of snout 408b and the diameter of the longitudinal hole 408a are linearly small from the front wall 408c toward the outside of the package 408.

Figure 12:
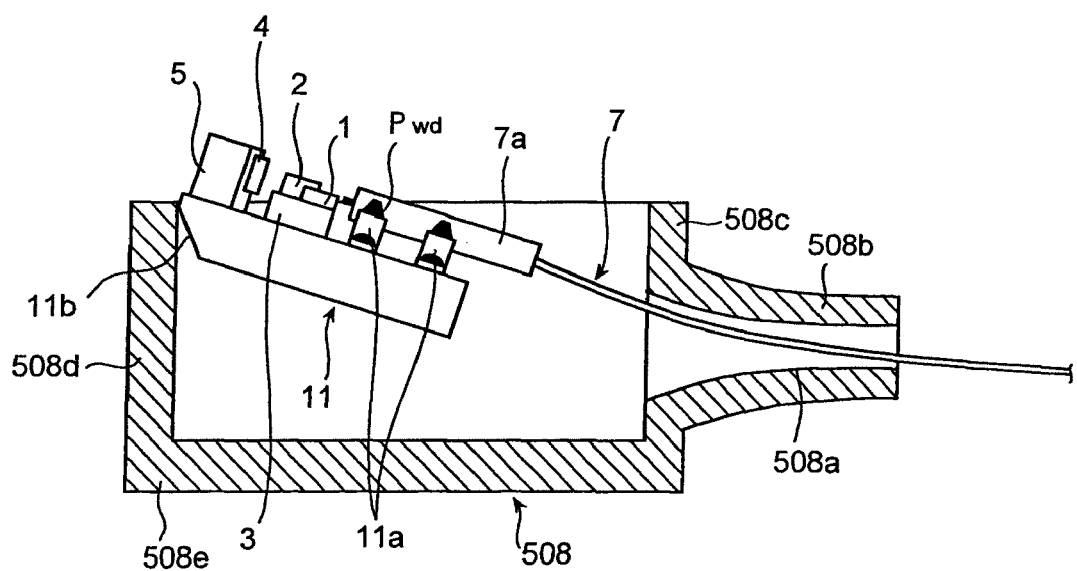
FIG. 12 is a longitudinal cross-sectional view of a LD module according to still another example of the second embodiment in the mounting step.

Furthermore, a package 508 may be used in place of the package 108 (see FIG. 12). The package 508 has a front wall 508c, a rear wall 508d, a bottom plate 508e, and a snout 508b having a longitudinal hole 508a. The external and internal faces of snout 508b are curved such that an external diameter of the snout 508b and a diameter of the longitudinal hole 508a become gradually small from the front wall 508c toward the outside of the package 508.

Figure 13:
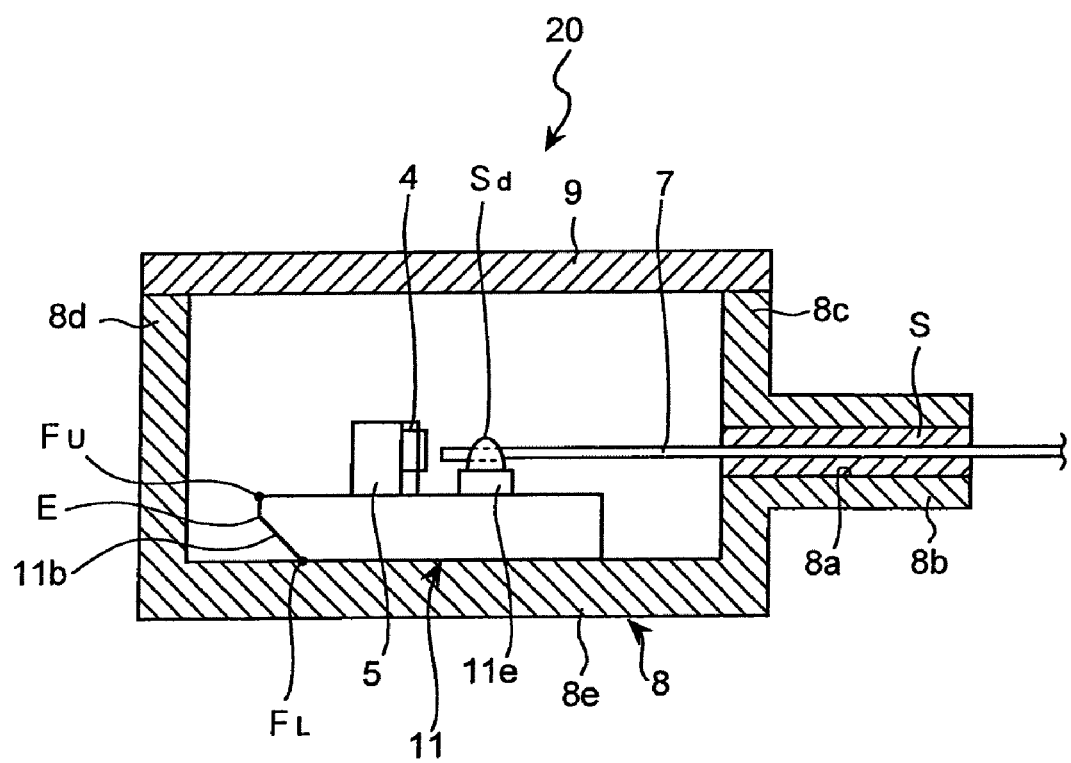
FIG. 13 is a longitudinal cross-sectional view of a PD module according to a third embodiment of the present invention.
Figure 14A:
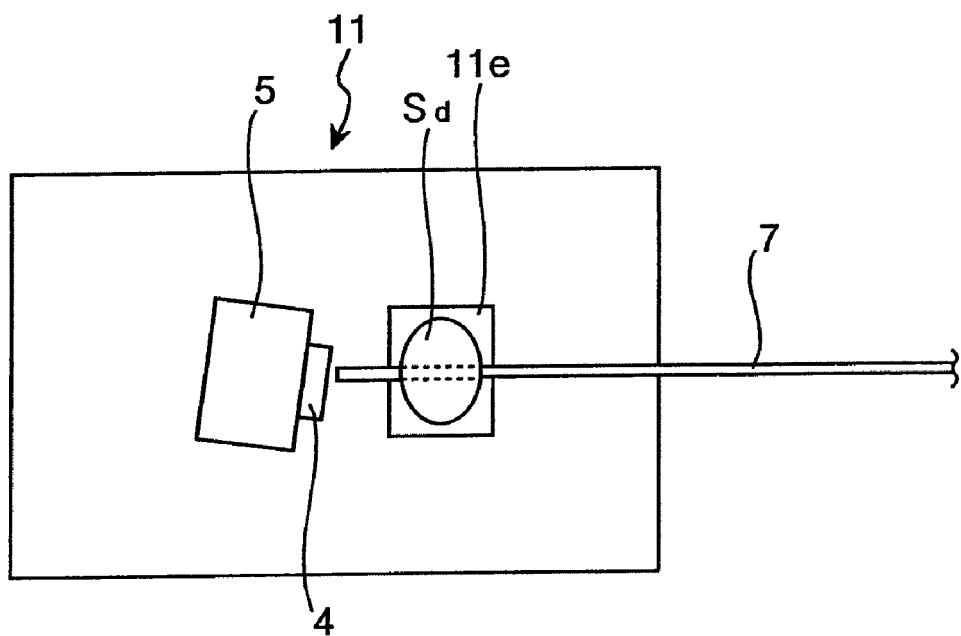
FIG. 14A is a top plan view of one example of a base used for the PD module shown in FIG. 13.
Figure 14B:
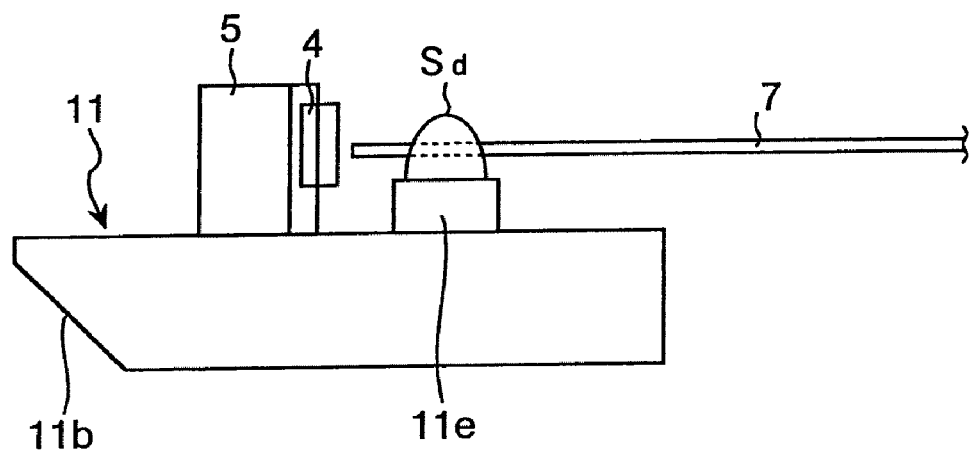
FIG. 14B is a side view of the base shown in FIG. 14A.

FIG. 13 is a longitudinal cross-sectional view of a PD module according to a third embodiment of the present invention. The PD module differs from the LD module shown in FIG. 1, in that the base 11 having the tapered rear end portion E is used for the PD module. The PD module 20 is an optical semiconductor module having a butterfly-type package. A carrier 5 on which a PD element 4 is provided and a metal support member 11e are mounted on the base 11. The metal support member 11e is fixed onto the base 11 with solder. The support member 11e may be made of nonmetal, such as ceramic, for example. The optical fiber 7 coated with metal is directly fixed onto the metal support member 11e with solder Sd, as shown in FIGS. 13, 14A, and 14B. A portion between the optical fiber 7 and the internal wall of the snout 8b is hermetically sealed with a sealant S like solder or synthetic resin. An upper portion of the package 8 is sealed with a lid 9.

Figure 15:
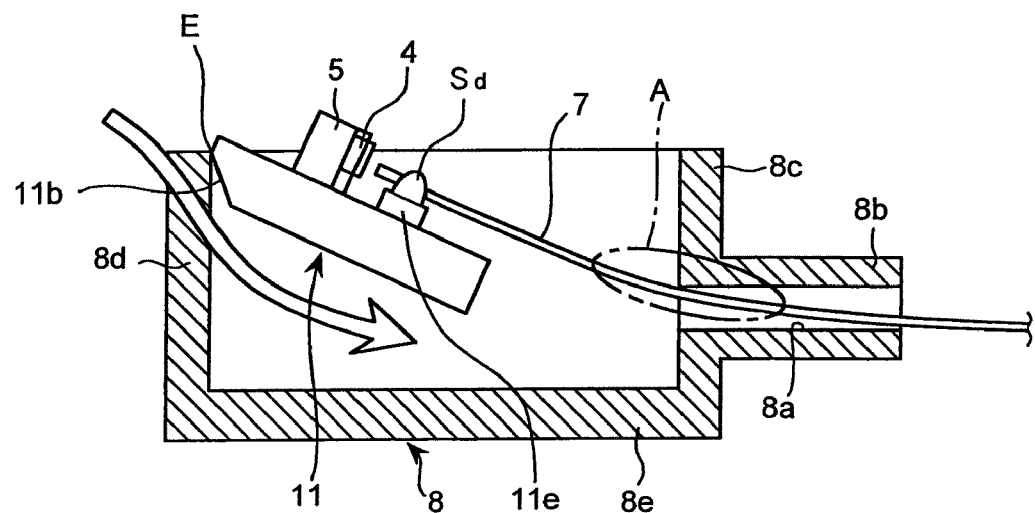
FIG. 15 is a longitudinal cross-sectional view of the PD module shown in FIGS. 14A and 14B in the mounting step.

The base 11 has the rear end portion E with the tapered face 11b, like that shown in FIG. 1. The PD module 20 is formed as explained above. Therefore, as shown in FIG. 15, in the mounting step of the base 11 into the package 8, it is possible to prevent an interference between the base 11 and the rear wall 8d of the package 8. Accordingly, the base 11 can be easily mounted into the package 8. Consequently, in the mounting step, there occurs no misalignment between the PD element 4 and the optical fiber 7. As a result, it becomes possible to avoid a reduction in the optical coupling efficiency between the PD element 4 and the optical fiber 7.

Since the rear end portion E of the base 11 has a taper, the optical fiber 7 is free from excessive bending at a portion A encircled by a dashed line in FIG. 15 when mounting the base 11 into the package 8 with the optical fiber 7 being inserted through the longitudinal hole 8a. Since the optical fiber 7 maintains a state of a large bending curvature radius, a breakage of the optical fiber 7 is avoided.

The rear end portion E of the base 11 may be formed into various shapes, such as, for example, the curved face 11c or the step 11d as shown in FIG. 5A or FIG. 5B.

Figure 16:
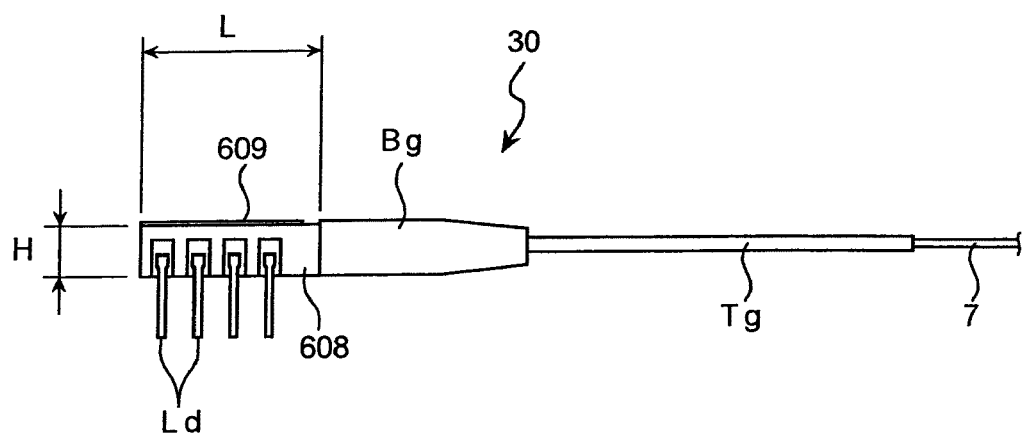
FIG. 16 is a side view of a LD module according to a fourth embodiment of the present invention.
Figure 17:
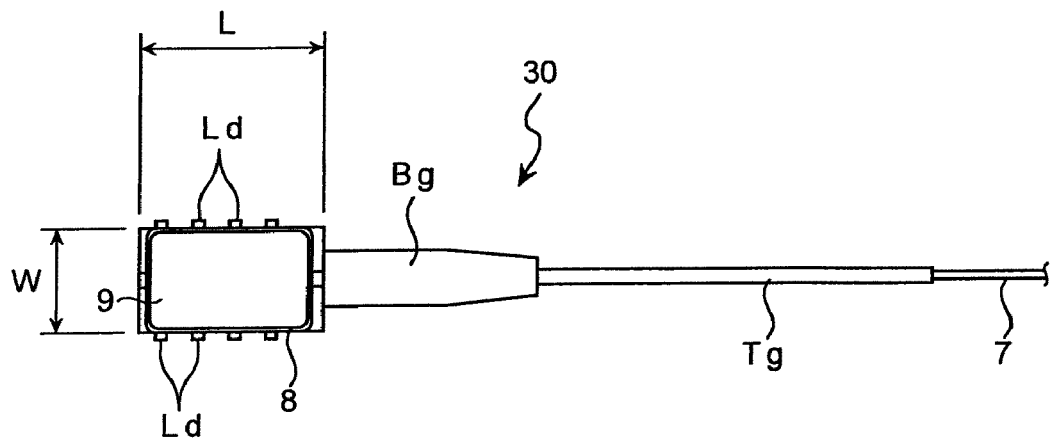
FIG. 17 is a top plan view of the LD module shown in FIG. 16.

FIG. 16 is a longitudinal cross-sectional view of a package of a LD module according to a fourth embodiment. The LD module 30 differs from the LD module 10 according to the first embodiment in the type of package. Concretely, in the LD module 30, a package 608 closed with a lid 609 is a DIL-type. FIG. 17 is a top plan view of the package of the LD module 30.

As shown in FIGS. 16 and 17, the LD module 30 has a plurality of leads Ld extending downward from the side surfaces of the package 608. An unillustrated snout of the package 608 is covered with a rubber covering $B_g$, and a part of the optical fiber 7 that is led out of the package 608 is protected by a protective tube $T_g$. The package 608 has a length L not larger than 16 millimeter, a width W not larger than 10 millimeter, and a height H not larger than 8 millimeter. The base 11 shown in one of FIG. 3 and FIGS. 5A to 6B is mounted into the package 8.

Therefore, although the LD module 30 is very small, the base 11 can be easily mounted into the package 608. Consequently, it is possible to avoid a reduction in the coupling efficiency between the laser beam emitted from the LD element 1 to the optical fiber 7.

Since a rear end portion E of the base 11 is formed into the taper 11b, a curved face 11c, or a step 11d, the optical fiber 7 is not excessively bent in the mounting step. As a result, the optical fiber 7 can be maintained at a large bending curvature radius, and thus free from breakage in the mounting step.

Note that if a longitudinal hole through which the optical fiber 7 passes is formed to have a larger size at the inside than at the outside of the package 608 as shown in FIGS. 7 to 12, it is possible to more surely suppress an excessive bending deformation of the optical fiber 7 in the mounting step, thereby to surely avoid a breakage of the optical fiber 7.

Figure 18:
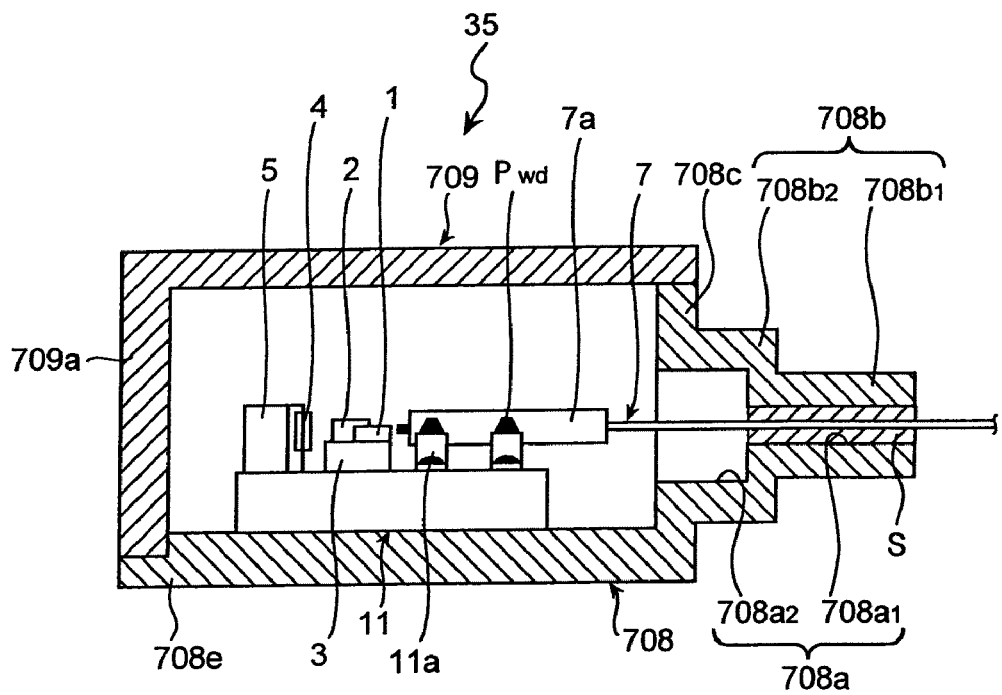
FIG. 18 is a longitudinal cross-sectional view of a LD module according to a fifth embodiment of the present invention.

FIG. 18 is a longitudinal cross-sectional view of a LD module according to a fifth embodiment of the present invention. The LD module 35 differs from the optical semiconductor modules according to the first through the fourth embodiments, in a base and a lid of a package. In the first through the fourth embodiment, the rear end portion of the base 11 or a longitudinal hole 708a provided in the snout 708b of a package 708 was processed in various ways. On the other hand, in the LD module 35, a butterfly-type or DIL-type package 708 fails to have a rear wall at a side opposite to the snout 708b, or it has a rear wall with at least a part thereof removed.

For example, in the LD module 35 shown in FIG. 18, the butterfly-type or DIL-type package 708 has no rear wall opposite to a front wall 708c. Instead, the wall that faces the front wall 708c is replaced by a perpendicular plate 709a that is integrated with a lid 709.

Figure 19:
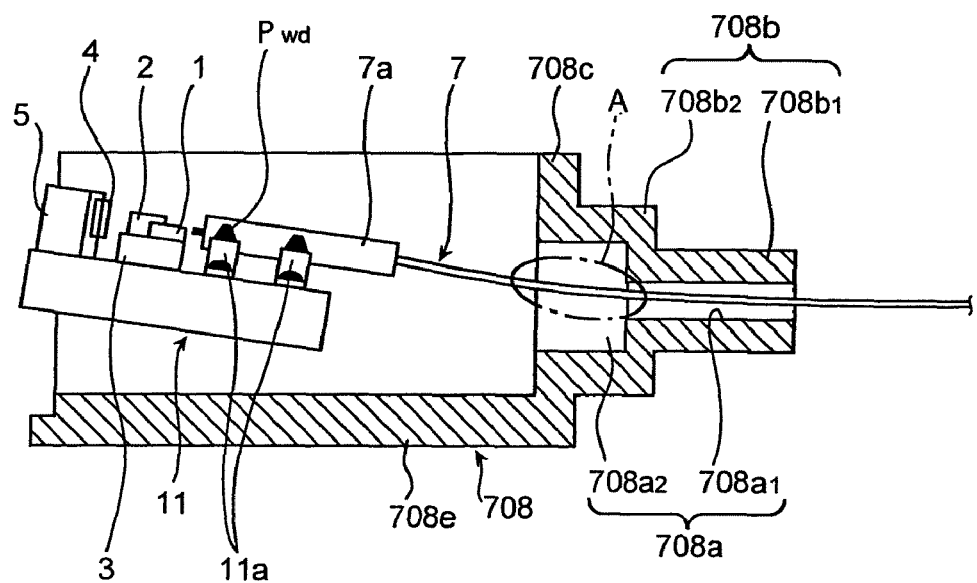
FIG. 19 is a longitudinal cross-sectional view of the LD module shown in FIG. 18 in the mounting step.

Therefore, as shown in FIG. 19, the package 708 is open at the rear side thereof (i.e., at the left side in FIG. 18 and FIG. 19) when mounting the base 11 onto the bottom plate 708e. Hence, it is possible to insert the base 11 into the package 708 from the left without causing interference of the optical fiber 7 with the inner wall of the longitudinal hole 708a at its end exposed on the front wall 708c. It is substantially unnecessary to curve the optical fiber 7 at a portion A of the package 708 encircled by a dashed line. Since the optical fiber 7 can be maintained at a large bending curvature radius, a breakage of the optical fiber 7 is avoided. Further, it becomes possible to avoid a reduction in the optical coupling efficiency between the LD element 1 and the optical fiber 7.

Another package and lid in place of the package 708 and the lid 709 may be used if the package is open at the side opposite to the snout before closing with the lid. For example, as shown in FIG. 20, a package 808 in place of the package 708 may be used for an LD module 45, wherein the upper portion of a rear wall 808d opposite to a front wall 808c is removed, and a perpendicular plate 809b provided integrally with the lid 809 may be located at this removed portion.

Figure 21:
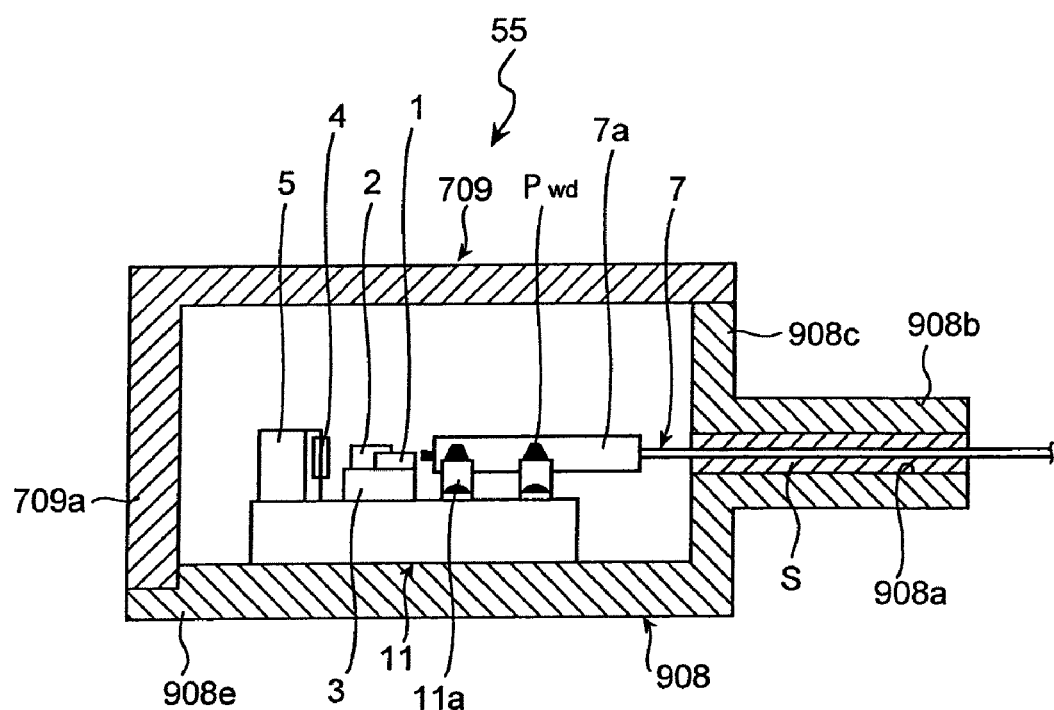
FIG. 21 is a longitudinal cross-sectional view of still another example of the LD module according to the fifth embodiment, having a different form of a snout from that shown in FIG. 18.

Since the optical fiber 7 can be inserted horizontally in this embodiment, a snout may be formed to have a longitudinal hole 908a with a diameter that is uniform in the longitudinal direction, as shown in FIG. 21.

Figure 20:
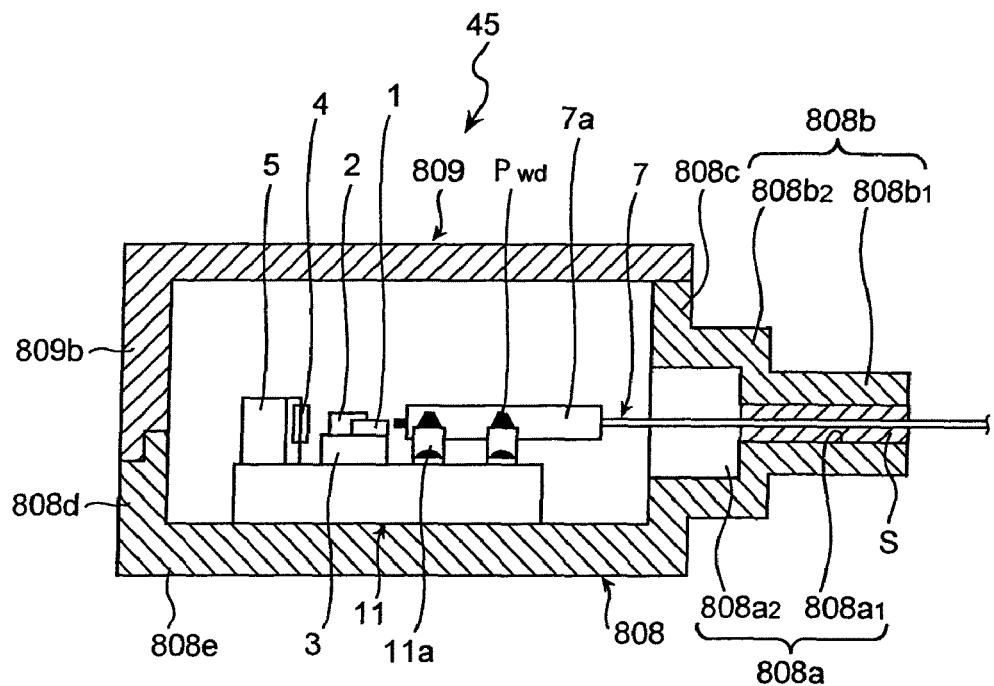
FIG. 20 is a longitudinal cross-sectional view of another example of the LD module according to the fifth embodiment, having a different package from that shown in FIG. 18.

These LD modules shown in FIGS. 20 and 21 make the mounting step easy, without substantially bending the optical fiber 7, in a similar manner to that shown in FIG. 19. Further, the rear end portion E of the base 11 may have a taper, a curved face or a step, like that shown in FIG. 3, FIG. 5A, or FIG. 5B, whereby it is possible to prevent the optical fiber 7 from being excessively bent due to the interference between the rear end portion E of the base 11 and the residual rear wall 808d, in the mounting step.

Figure 22A:
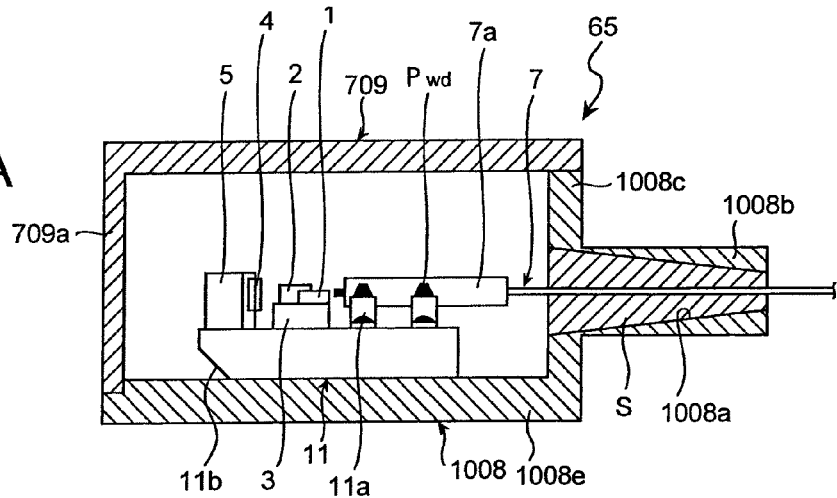
FIGS. 22A to 22C are longitudinal cross-sectional views of still other examples of the LD module according to the fifth embodiment, having different forms of a snout and different forms of a base from the LD module shown in FIG. 18.
Figure 22B:
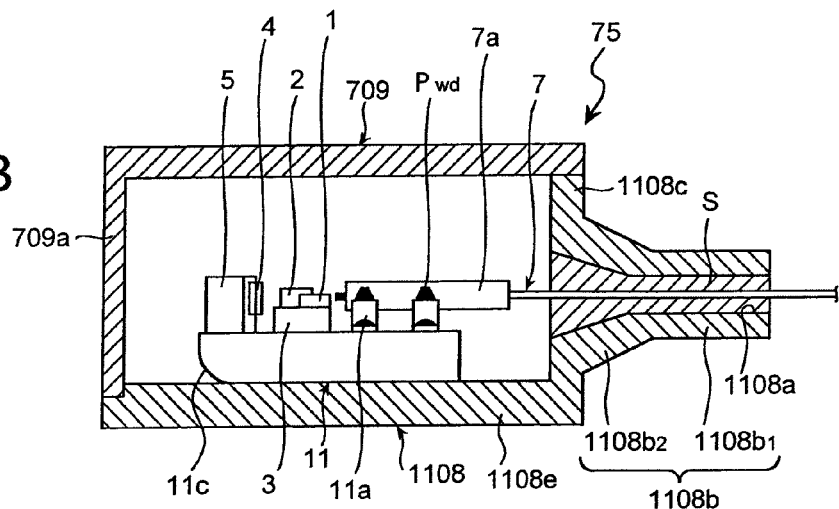
Figure 22C:
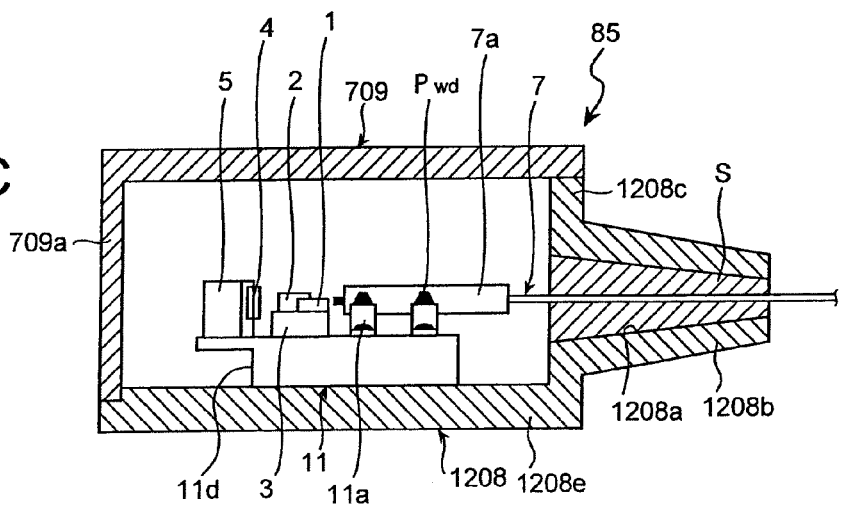
Figure 23A:
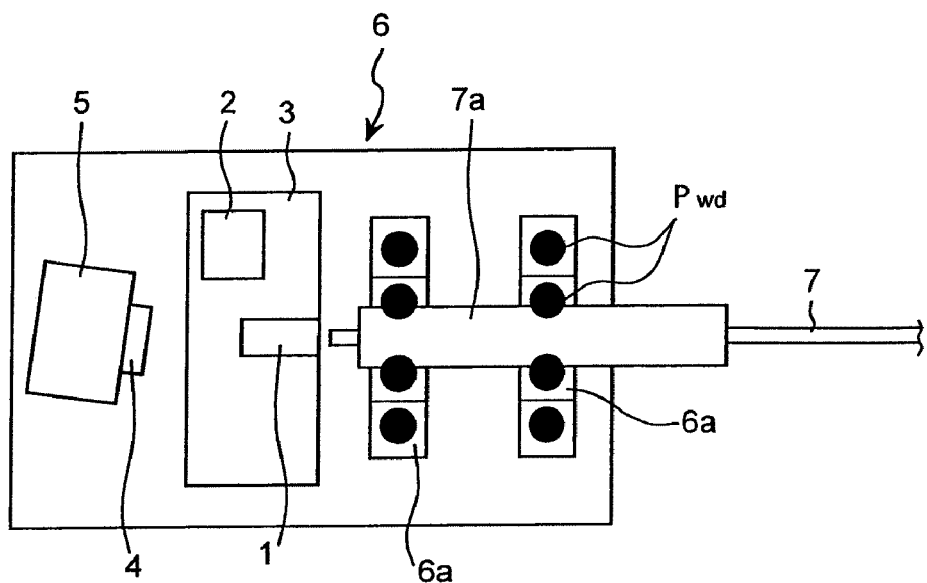
FIG. 23A is a plan view of a part of a conventional LD module.
Figure 23B:
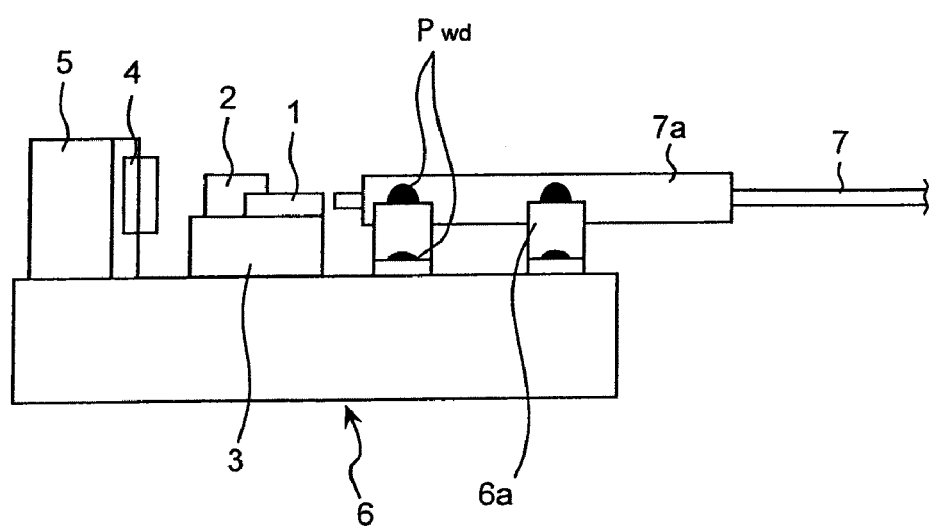
FIG. 23B is a side view of the part.

In addition, a snout of the package may have forms other than those shown in FIGS. 18 and 21. For example, LD modules 65, 75, and 85 shown in FIGS. 22A to 22C have packages 1008, 1108, and 1208, respectively. A snout 1008b of the package 1008 shown in FIG. 22A corresponds to the snout 208b shown in FIG. 9, a snout 1108b of the package 1108 shown in FIG. 22B corresponds to the snout 308b shown in FIG. 10, and a snout 1208b of the package 1208 shown in FIG. 22C corresponds to the snout 408b shown in FIG. 11.

These package may be used for not only the LD module but also the PD module according to the third embodiment.

Advantages derived from the present invention may include one or more of the following.

According to one or more embodiment of the present invention, it is easy to mount the base into the package.

According to one or more embodiment of the present invention, it is possible to avoid a reduction in the coupling efficiency between the optical fiber and the optical semiconductor element.

According to one or more embodiment of the present invention, it is possible to prevent the optical fiber from being excessively bent, thereby to maintain the state of a large radius of bending curvature and prevent a breakage of the optical fiber.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical semiconductor module including a base having installed thereon an optical fiber and an optical semiconductor element, and a package which houses the base on a bottom thereof and has a first side wall with an outlet section through which the optical fiber is led and a second side wall facing the first wall, wherein
   the base is cut off to form a terrace at a lower corner on a side of the base facing the second side wall of the housing, wherein
   a ratio of h/t is from 0.4 to 1.0 and a ratio of L/t is from 0.4 to 1.0, where t is a thickness of the base, h is a distance between the terrace and the bottom, and L is a width of the terrace.

2. The optical semiconductor module according to claim 1, wherein the outlet section is a snout-like outlet with a through hole, a cross-section of which at a base thereof is larger than that of the through hole at a free edge thereof.

3. The optical semiconductor module according to claim 2, wherein a diameter of the through hole at the base is larger than a diameter of the through hole at the free edge.

4. The optical semiconductor module according to claim 1, wherein the optical fiber includes an optical fiber connected to a lens.

5. The optical semiconductor module according to claim 1, wherein the optical semiconductor element includes at least one of a semiconductor laser element of a photodiode element.

6. The optical semiconductor module according to claim 1, wherein the optical fiber is coated with a metal.

* * * * *